United States Patent [19]

Yan

[11] Patent Number: 4,800,051

[45] Date of Patent: Jan. 24, 1989

[54] METHOD FOR FABRICATING CERAMIC MATERIALS

[75] Inventor: Man F. Yan, Berkeley Heights, N.J.

[73] Assignee: American Telephone and Telegraph Company, AT&T Bell Laboratories, Murray Hill, N.J.

[21] Appl. No.: 37,074

[22] Filed: Apr. 13, 1987

Related U.S. Application Data

[63] Continuation of Ser. No. 647,273, Sep. 4, 1984, abandoned, which is a continuation of Ser. No. 374,311, May 3, 1982, abandoned.

[51] Int. Cl.$^4$ .............................................. C04B 35/64
[52] U.S. Cl. ......................................... 264/56; 501/12
[58] Field of Search ................ 264/86, 63, 56; 501/12

[56] References Cited

U.S. PATENT DOCUMENTS

| | | | |
|---|---|---|---|
| 3,163,688 | 12/1964 | Lindenthal | 364/86 |
| 4,296,057 | 10/1981 | Ziegenhain | 264/63 |
| 4,320,074 | 3/1982 | Birchall | 264/65 |
| 4,341,725 | 7/1982 | Weaver | 264/86 |

OTHER PUBLICATIONS

W. H. Rhodes, "Agglomerate and Particle Size Effects on Sintering Yittria-Stabilized Zirconia", Journal of the American Ceramic Society, vol. 64, No. 1, Jan. 1981, pp. 19–22.

W. E. Hauth, Jr., "Slip Casting of Aluminum Oxide", Journal of the American Ceramic Society, vol. 32, No. 12, 1949, pp. 394–398.

Yoldas, Preparation of Glasses and Ceramics from Metal-Organic Compounds, in Journal of Materials Science, 12(1977), pp. 1203–1208.

*Primary Examiner*—James Derrington
*Attorney, Agent, or Firm*—Richard D. Laumann; Peter A. Businger; Oleg E. Alber

[57] ABSTRACT

Low temperature sintering of grade materials sintered to 99 percent of the theoretical density is described using TiO$_2$ powder prepared by hydrolyzing titanium isopropoxide and calcining at 850° C.

19 Claims, No Drawings

METHOD FOR FABRICATING CERAMIC MATERIALS

This application is a continuation, of application Ser. No. 647,273, filed Sept. 4, 1984, now abandoned, which is a continuation, of application Ser. No. 374,311, filed May 3, 1982, now abandoned.

TECHNICAL FIELD

This invention relates generally to methods for ceramic fabrication and particularly to such methods having a low temperature sintering step.

BACKGROUND OF THE INVENTION

Devices fabricated from ceramic materials have many important technological applications. For example, they are useful as magnets, capacitors, thyristors, thermistors, as well as in many other applications. Many techniques have been developed for fabrication of these materials and most, if not all, require a high temperature sintering step.

Many types of devices using ceramic materials are electrical devices which require one or more electrical contacts. However, the high sintering temperature, typically 1400° C., greatly restricts the materials that may be used to form the electrodes. As many of the electrode materials are precious metals and since the price of these metals has greatly increased in recent years, methods of ceramic fabrication which permit use of lower sintering temperatures and, thus cheaper electrode materials, would be desirable. Of course, low sintering temperatures are also desirable in the fabrication of other types of devices because, for example, the lower energy costs of said easier compositional control when volatile components are present permitted by the low sintering temperature are desirable.

Multilayer ceramic capacitors are an example of an electrical device for which a lower sintering temperature would be desirable. Processing of multilayer ceramic capacitors typically requires placing an electrode material between layers of ceramic material. Both the ceramic layers and layers of electrode material are cosintered at an elevated temperature in an oxidizing atmosphere. Barium titanate ceramic powders, which are commonly used in multilayer ceramic capacitors, typically require a sintering temperature of approximately 1400° C. At such a relatively high temperature, precious metals such as Ag-Pd alloys, are typically required for the electrode materials. Alternatives, such as an electrode consisting of Ag, cannot be used unless the ceramic material can be sintered at temperatures below the melting point, approximately 962° C., of Ag.

Various approaches have been taken in efforts to lower the sintering temperatures. One approach decreases the sintering temperatures by chemical means by, for example, adding dopants to the ceramic compositions prior to sintering. However, this approach is often undesirable as the dopants may produce deleterious effects on the dielectric properties of the ceramic composition. A second approach prepares the ceramic powder with optimal physical characteristics so that sintering can proceed at low temperatures. One example of this approach was reported in *Journal of the American Ceramic Society,* 64, pp. 19-22, 1981. This paper reported using de-agglomerated submicron powders of $Y_2O_3$ stabilized $ZrO_2$ which could be sintered at 1100° C. This temperature is approximately 300° C. lower than the normal sintering temperature.

SUMMARY OF THE INVENTION

We have found that ceramic materials can be sintered to high densities at relatively low temperatures by ball milling within a pH range that maximizes metal oxide powder dispersion within the slurry; and sintering. The metal oxide powder, in a preferred embodiment, is prepared by a method that comprises hydrolyzing at alkoxide to form a slurry, drying the metal oxide powder in said slurry, granulating, and calcining. In a further preferred embodiment, an alcohol is added to the alkoxide. In yet another preferred embodiment, the ceramic material prepared by the method comprises $TiO_2$. In a still further preferred embodiment, the ceramic material prepared by the method comprises $TiO_2$ prepared by hydrolysis of a Ti-alkoxide, such as isopropoxide, which is sintered to 99 percent of its theoretical density at 850° C. This temperature is approximately 500° C. below the normal sintering temperature.

DETAILED DESCRIPTION

Ceramic oxide materials may be sintered at relatively low temperature by using nonagglomerated ceramic powder having a very small particle size. The metal oxide powder is ball milled in a slurry having a pH value within a range that maximizes powder dispersion in the slurry. The pH controls the surface charge on the particle and helps reduce the tendency toward agglomeration. The small size of the particles is desirable as it leads to small voids in compacted material that are easier to remove during the sintering process and thus leads to higher densities. However, small particle size alone is not sufficient as the particles must also be dispersed in the slurry to prevent agglomeration which again may lead to large voids and result in lower densities after sintering.

In a preferred embodiment, the powder is prepared by a process that begins with the hydrolysis of an alkoxide. If the viscosity of the alkoxide is undesirably high at the desired processing temperature, it may be reduced by dissolving the alkoxide in an appropriate alcohol. The addition of the alcohol should also result in smaller particle sizes. If several metals are desirably present in the ceramic material, more than one alkoxide will be used. The use of an alkoxide affords a convenient way of introducing the desired metal atom while yielding reaction products, a metal oxide and an alcohol, after hydrolysis that do not react with each other.

After hydrolysis, the metal oxide powder will generally undergo intermediate processing steps before ball milling. The appropriate intermediate steps will typically include drying the powder in the slurry produced during hydrolysis and then granulating and calcining the powder. After ball milling has been completed, the slurry may be allowed to stand for a period of time to permit the larger particles to settle. After settling for a period of time, the supernatant slurry may be drawn off and the particles compacted. This process selects the smaller particle and increases attainable densities.

The degree of powder dispersion which should be maximized during ball milling depends upon the pH of the solution. The slurry viscosity and sedimentation studies may be used to determine the amount of powder dispersion and thus, the critical pH values and ranges, in the slurry. In general, a slurry having a more dispersed powder has a relatively lower viscosity than does one having a less dispersed powder. There are reports in the literature, see, for example, *Journal of the American Ceramic Society*, 12, pp. 394–398, 1949, showing the relationship between the apparent viscosity of the slurry and its pH. It was hypothesized that oxide surfaces generally contain ionizing sites from which $H^+$ or $OH^-$ may be released resulting in a net surface charge and a potential difference between the oxide surface and the liquid medium far from the oxide surface. This potential difference is commonly referred to as the zeta potential and analyses have shown that it reaches maximum values at critical pH values or ranges. These values or ranges are determined by the fact that the ionization of the oxide surface depends on the pH of the liquid medium at which the oxide is at equilibrium. Since every particle carries the same charge and has the same zeta potential, the electrostatic repulsion between particles can prevent the close approach, that is, flocculation, of the particles. If the zeta potential is sufficiently large, the electrostatic repulsion becomes significant and overcomes the van der Waal attractive force and the particles remain dispersed in the liquid. The relatively low viscosity is desirable because it results in a slurry having well dispersed particles.

The sedimentation velocity of solid particles may be calculated from Stoke's equation which shows that the velocity increases with the square of the particle size. Thus, in slurries having fine particles, sedimentation typically proceeds slowly. As an example, $TiO_2$ powder prepared as described below, has a particle radius of approximately 0.02 $\mu$m and, when well dispersed, has a sedimentation velocity less than 0.1 mm/day.

However, fine particles tend to form agglomerates and each agglomerate may consist of $10^3$–$10^5$ loosely bound particles with a rather low solid content. Since the agglomerate size is much larger than the particle size, the sedimentation velocity of the agglomerates may be much larger than that expected for the individual particles. When the agglomerates consist primarily of particles of approximately the same size, their sedimentation velocities are inversely proportional to the solid fractions in the agglomerates. Thus, the sedimentation velocity can be relatively rapid even when the fine particles form a bulky and low density agglomerate. Consequently, the degree of powder dispersion can be directly related to the sedimentation velocity.

The method appears well adapted for use with $Al_2O_3$, $ZrO_2$, and $TiO_2$ and will be illustrated by specific reference to $TiO_2$. Submicron $TiO_2$ powder is prepared by hydrolysis of titanium alkoxides, e.g., titanium ethoxide, titanium isopropoxide and titanium butoxide. The hydrolysis reaction is represented by the following chemical reactions:

$$2Ti(OC_nH_{2n+1})_4 + 2H_2O \rightarrow 2TiO(OC_nH_{2n+1})_2 + 4C_nH_{2n+1}OH \quad (1)$$

$$2TiO(OC_nH_{2n+1})_2 \rightarrow TiO_2 + Ti(OC_nH_{2n+1})_4 \quad (2)$$

The net reaction is:

$$Ti(OC_nH_{2n+1})_4 + 2H_2O \rightarrow TiO_2 + 4C_nH_{2n+1}OH \quad (3)$$

where n=2, 3 and 4, for titanium ethoxide, titanium isopropoxide and titanium butoxide, respectively. Thus, each mole of titanium alkoxide reacts with 2 moles of water to yield 1 mole of $TiO_2$ and 4 moles of alcohol.

Certain cation dopants, e.g., Al, Nb and Ta, are often desirably added to $TiO_2$ to control certain electrical characteristics. The dopants can be introduced in the form of a metal alkoxide which is dissolved in the titanium alkoxide. For example, when Al is the desired dopant, an appropriate amount of, for example, aluminum butoxide is dissolved in titanium butoxide. When Ta or Nb is the desired dopant, an appropriate amount of, for example, tantalum ethoxide or niobium ethoxide is dissolved in titanium ethoxide. Since the precursors of the cation dopants and $TiO_2$ are both in a miscible solution, a homogeneous distribution of the dopants in $TiO_2$ is achieved.

The melting points of the titanium alkoxides are close to typical processing temperatures, for example, 25° C., and the liquid alkoxides are very viscous at these temperatures. The viscosity of the alkoxides may be reduced by dissolving the alkoxide in an appropriate alcohol, for example, titanium ethoxide in ethyl alcohol, titanium isopropoxide in isopropyl alcohol and titanium butoxide in butyl alcohol.

The alcohol content of the diluted alkoxide solution is desirably less than 95 percent. The diluted solution also yields a smaller particle size of the $TiO_2$ hydrolysis reaction production. For example, the size of the $TiO_2$ particles prepared with an alkoxide solution comprising 10 percent titanium isopropoxide and 90 percent isopropyl alcohol is approximately 25 percent of that of particles prepared with undiluted titanium isopropoxide. It is hypothesized that the particle size is reduced by the alcohol dilution because the particle size is determined by the frequency of the Brownian collisions between $TiO_2$ molecules. In a diluted condition, the $TiO_2$ molecules are less concentrated and their collision frequency is reduced.

The processing may proceed as follows. The reactions desirably occur at a temperature, such as 25° C., at which the titanium alkoxide, for example, isopropoxide, remains a liquid. As titanium isopropoxide solution contacts water, it reacts rapidly to form cloudy precipitates. The titanium isopropoxide may, for example, be sprayed into stirring water. An inert gas, such as nitrogen, is desirably above the moving water to minimize $CO_2$ contamination.

The liquid is removed from the slurry by filtering through appropriate filter paper having a small diameter, typically less than 2–3 $\mu$m, openings. The resulting filtrate appears as a clear liquid which indicates that the agglomerate sizes of the precipitates formed during hydrolysis are larger than the openings in the filter paper. The residue is removed and mixed thoroughly with distilled water, preferably triply distilled, to remove any unreacted titanium isopropoxide. The slurry is then filtered to remove the liquid. The residue is then mixed with isopropyl alcohol and again filtered. The process of mixing and washing with alcohol followed by filtration is desirably repeated several times, for example, three, to remove residual water.

The filtered powder is then dried at approximately 100° C. for approximately 1 hour. The dried powder is granulated through a screen having, for example, 850 $\mu$m diameter openings, and calcined at a temperature of approximately 550° C. in air for 16 hours. The calcined powder is then milled for approximately 3 hours in a $HCl$-$H_2O$ solution having a pH of approximately 2.1 using $ZrO_2$ milling media in a polypropylene container. The slurry has a solid content of approximately 14 percent by weight.

A pH of 2.1 appears most desirable as it appears that this maximizes the TiO₂ powder dispersion in aqueous solutions. Any pH within the range from approximately 1.8 to approximately 2.4 may be advantageously used. Agglomerates are likely to form outside this range.

After ball milling, the powder slurry was allowed to stand for 72 hours. The supernatant slurry, which consisted of only the finest particles in suspension, was removed by siphoning and concentrated into compacts by, for example, centrifuging. The resulting powder compact was dried at approximately 105° C. for approximately 16 hours. The resulting compacts are then sintered at temperatures between 650° C. and 1200° C. Flowing oxygen may be used as the sintering atmosphere.

The densities of the resulting materials were measured by the Archimedes method with CCl₄ being the submersion liquid. The relative densities determined were based on the theoretical density of 4.26 g/cm³. Both doped and undoped TiO₂ prepared by the described method and sintered at 850° C. for 2 hours in oxygen had densities greater than 99.5 percent of the theoretical value and a grain size less than 0.5 μm.

It is generally accepted by those working in the art that there are relatively simple laws which govern the times required to produce, by sintering at a given temperature, geometrically similar changes in two or more systems of solid particles that are identical except for differences in particle dimensions. As an example, if a time, $t_1$, is required to sinter spherical particles with a radius, $r_1$, at a given temperature, then the time, $t_2$, required to sinter particles having a radius, $r_2$, is given by the equation:

$$t_2 = \left(\frac{r_2}{r_1}\right)^n t_1 \tag{4}$$

where the value of n depends on the mass transport mechanism for sintering. The value of n is 3 for lattice diffusion and 4 for grain boundary diffusion. It is generally further assumed by those working in the art that the required sintering time increases exponentially with the reciprocal temperature. At low temperatures and with samples having small grain sizes, grain boundary diffusion is generally the more important mass transport mechanism leading to densification. Grain boundary diffusion in TiO₂ has not been reported in the literature but the activation energy of grain boundary diffusion is generally smaller than that of lattice diffusion. Thus it could be expected that the small particle size leads to a decrease in the sintering temperature.

It is important that, prior to low temperature sintering, TiO₂ powder be well dispersed prior to compaction. In the method described, large agglomerates formed during hydrolysis and calcination were removed by sedimentation. Thus, only the fine and unagglomerated particles were concentrated into the dense compact by centrifuge. The removal of agglomerates led to a more uniform distribution of density in the specimens prepared. Pore size distribution is more uniform and densification can proceed more readily without being rate limited by the residual pores as it is when the samples have a nonuniform density.

The powder compacts may be prepared by methods other than centrifuge techniques. For example, isostatic pressing can result in compacts having the desired uniform density distribution.

After sintering has been completed, device fabrication may proceed with, for example, the fabrication of electrical contacts to the ceramic material.

What is claimed is:

1. A method of preparing bodies of ceramic material comprising at least one metal oxide selected from the group consisting of Al₂O₃, ZrO₂ and TiO₂, which comprises
   preparing metal oxide(s) powder by hydrolysis technique including hydrolyzing suitable metal alkoxide(s), washing, drying, granulating and calcining,
   ball milling the calcined metal oxide(s) powder as a slurry comprising an aqueous solution having pH selected to maximize the powder dispersion in the solution at least during the said ball milling,
   compacting the dispersed powder from the ball-milled slurry into a powder compact, said compacting including drawing-off a supernatant liquid from the ball-milled slurry, forming powder from the supernatant liquid into at least one powder compact, and drying the powder compact(s), and
   sintering the powder compact(s) at suitable, relatively low sintering temperatures.

2. The method of claim 1 wherein said pH ranges from 1.8 to 2.4.

3. The method of claim 2 wherein said pH is approximately 2.1.

4. The method of claim 1 wherein said sintering is conducted at a temperature ranging from 650° C. to 1200° C.

5. The method of claim 1 wherein said metal oxide is TiO₂.

6. The method of claim 5 wherein said at least one alkoxide is selected from the group consisting of titanium ethoxide, titanium isopropoxide, and titanium butoxide.

7. The method of claim 5 wherein said ceramic material further comprises elements selected from the group consisting of Al, Nb and Ta.

8. The method of claim 1 wherein said hydrolyzing step includes adding alcohol to said alkoxide(s).

9. In the method of preparing ceramic bodies by the steps comprising ball milling, as an aqueous slurry, metal oxide(s) powder prepared by hydrolysis technique, forming the ball milled powder into a suitable form and sintering, said hydrolysis technique including hydrolyzing at least one suitable metal alkoxide, washing, drying, granulating and calcining, CHARACTERIZED BY conducting the said ball milling with a slurry comprising an aqueous solution having pH selected to maximize the powder dispersion in the solution during the said ball milling.

10. The method of claim 9 wherein said pH ranges from 1.8 to 2.4.

11. The method of claim 10 wherein said pH is approximately 2.1.

12. The method of claim 9 wherein said sintering is conducted at a temperature ranging from 650°˙ C. to 1200° C.

13. The method of claim 12 wherein said metal oxide is TiO₂.

14. The method of claim 13 wherein said ceramic material further comprises elements selected from the group consisting of Al, Nb and Ta.

15. The method of claim 9 wherein said at least one metal alkoxide being selected from the group consisting of titanium ethoxide, titanium isopropoxide and titanium butoxide.

16. The method of claim 9 wherein said hydrolyzing step includes adding alcohol to said alkoxide(s).

17. The method according to claim 9 wherein said forming step includes drawing-off a supernatant liquid from the ball-milled slurry, forming powder from the supernatant liquid into at least one powder compact, and drying said at least one powder compact.

18. The method of claim 9 wherein said ceramic material comprises at least one metal oxide selected from the group consisting of $Al_2O_3$, $ZrO_2$, and $TiO_2$.

19. The method of claim 9 wherein said sintering step is conducted at suitable, relatively low sintering temperatures.

* * * * *